United States Patent
Chen et al.

(10) Patent No.: US 7,613,785 B2
(45) Date of Patent: Nov. 3, 2009

(54) DECREASED RESPONSE TIME FOR PEER-TO-PEER REMOTE COPY WRITE OPERATION

(75) Inventors: James C. Chen, Tucson, AZ (US); Minh-Ngoc L. Huynh, San Jose, CA (US); Matthew J. Kalos, Tucson, AZ (US); Chung M. Fung, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 1399 days.

(21) Appl. No.: 10/719,229

(22) Filed: Nov. 20, 2003

(65) Prior Publication Data
US 2005/0114358 A1   May 26, 2005

(51) Int. Cl.
G06F 7/00 (2006.01)
(52) U.S. Cl. .............. 709/212; 709/207; 709/201; 709/238; 709/224; 709/239; 711/165; 711/112; 711/156; 711/161; 711/162; 707/100
(58) Field of Classification Search ........... 709/212, 709/207, 201, 238, 224, 239, 213, 214
See application file for complete search history.

(56) References Cited
U.S. PATENT DOCUMENTS 6,446,175 B1 * 9/2002 West et al. ............. 711/162
6,643,671 B2 * 11/2003 Milillo et al. ............ 707/204
2002/0133511 A1 * 9/2002 Hostetter et al. ......... 707/204
2003/0126282 A1   7/2003 Sarkar et al.
2005/0027892 A1   2/2005 McCabe et al.

* cited by examiner

Primary Examiner—Jude J Jean Gilles
(74) Attorney, Agent, or Firm—Dan Shifrin

(57) ABSTRACT

Methods, system and computer program product are provided to improve the efficiency of data transfers in a PPRC environment. Any or all of three features may be implemented, each of which reduces the number of round trips required for the exchange of handshaking, data and control information. A first feature includes disabling the "transfer ready" acknowledgment which normally occurs between a primary storage controller and a secondary storage controller. A second feature includes pre-allocating payload and data buffers in the secondary storage controller. A third feature includes packaging write control information with a write command in an extended command descriptor block (CDB). Such a step eliminated the need for a separate transmission of the write control information. The CDB is transmitted along with a data block from the primary storage controller to the secondary storage controller and placed in the respective, pre-allocated buffers. Data may also be pipelined to the secondary. By decreasing the response time for data transfers, the distance separating the primary and secondary storage controllers may be increased.

35 Claims, 3 Drawing Sheets

DECREASED RESPONSE TIME FOR PEER-TO-PEER REMOTE COPY WRITE OPERATION

TECHNICAL FIELD

The present invention relates generally to peer-to-peer remote copy (PPRC) storage systems and, in particular, to reducing the number of round trips required to complete a write operation between a primary storage control unit and a secondary storage control unit.

BACKGROUND ART

Data integrity and availability is a critical factor in large computer data systems. Consequently, backup data storage systems have been developed to prevent the loss of data in the event of various types of failures. One such backup system is known as "peer-to-peer remote copy" (PPRC). As illustrated in FIG. 1, in a PPRC system 100, data generated by a host device 110 is stored on a primary storage unit 120. A copy of the data is also transmitted, such as over a fibre channel network 130, and stored on a secondary storage unit 140. Because of the flexibility of network interconnections, the primary and secondary units 120 and 140 may be physically located remote from the host 110. And, for data security, the primary and secondary units 120 and 140 are physically located distant from each other, thereby reducing the likelihood of a single disaster simultaneously harming both the primary and secondary units 120 and 140.

The distance by which the primary and secondary units 120 and 140 may be separated is dependent upon numerous factors. One significant factor is the total response time of each I/O operation (such as a write operation); that is, the amount of time required for a block of data to be transferred from the primary storage unit 120 to the secondary storage unit 140, including all handshaking. Typically, the longer the response time, the shorter the distance which may practically separate the two units. And, a significant factor in determining the response time is the number of round trips of command and data which must take place to complete a transfer of data. As will be appreciated, the more round trips which are necessary, the slower the effective transfer rate becomes.

One such round trip occurs when the primary and secondary units 120 and 140 exchange "transfer ready" signals prior to a write operation. The primary unit 120 (also known as the initiator) transmits a message to the secondary unit 140 (also known as the target) indicating that data is ready to be transferred. Until the primary unit 120 receives an appropriate acknowledgement from the secondary unit 140, transfer of the data cannot begin. Among other items, the acknowledgement indicates that the secondary unit has prepared the necessary buffers and is ready to receive the data. Such preparation may entail some delay and the handshaking itself results in some delay as well. Thus, such a transfer requires two round trips (the transfer ready exchange and the transfer of data with a subsequent acknowledgement of receipt) and results in a corresponding delay.

Another round trip occurs when additional control information is transferred from the primary unit 120 to the secondary unit 140 before the data itself is transferred. Such additional control information may not be able to fit within a conventional write command, such as a command descriptor block (CDB). Thus, another round trip is necessary to separately transfer the control information.

Other factors may necessitate further round trips. Transferring data over a conventional fibre channel network may entail three to four round trips and the distance between the primary storage unit 120 and the secondary storage unit 140 may thus be limited to about 100 kilometers.

Consequently, in order to increase the distance between the primary and secondary units, it remains desirable to reduce the response time for data transfers.

SUMMARY OF THE INVENTION

The present invention provides method, system and computer program product to improve the efficiency of data transfers in a PPRC environment. Any or all of three features may be implemented, each of which reduces the number of round trips required for the exchange of handshaking, data and control information. A first feature includes disabling the "transfer ready" acknowledgment which normally occurs between a primary storage controller and a secondary storage controller. Disabling such acknowledgement eliminates one round trip.

A second feature includes pre-allocating payload and data buffers in the secondary storage controller. Pre-allocating buffers permits buffers to be available immediately upon receipt of payload information and data blocks, thereby reducing response time. A third feature includes packaging write control information with a write command in an extended command descriptor block (CDB). Such a step eliminated the need for a separate transmission of the write control information. The CDB is transmitted along with a data block from the primary storage controller to the secondary storage controller and placed in the respective, pre-allocated buffers.

Data may be pipelined to the secondary; that is, a block of data may be transmitted from the primary without waiting for acknowledgment from the secondary that the previous block of data was received.

By increasing the response time for data transfers, the distance separating the primary and secondary storage controllers may be increased.

DETAILED DESCRIPTION OF THE PREFERRED EMBODIMENT

Figure 1:
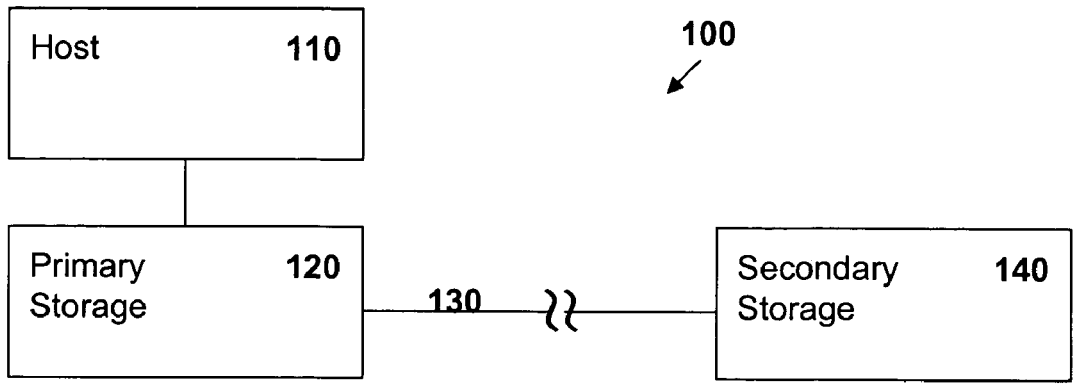
FIG. 1 is a block diagram of an exemplary PPRC data storage system.
Figure 2:
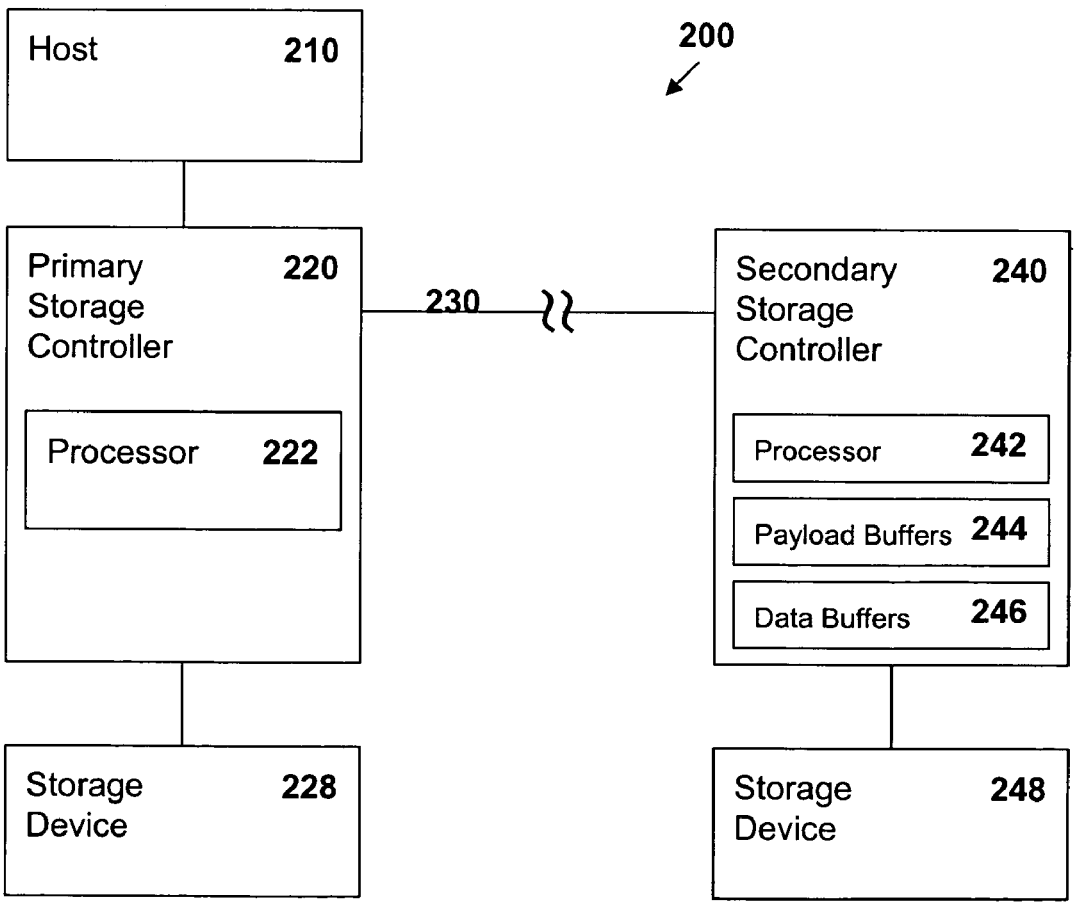
FIG. 2 is a block diagram of a data storage system in which the present invention may be implemented.

FIG. 2 is a block diagram of a data storage system 200 in which the present invention may be implemented. The system 200 may be a PPRC system in which a host device 210 transmits data to a primary storage controller 220 for storage on a storage device (such as an array of disk dives) 228. Additionally, the primary storage controller 220 transfers a copy of the data over a network 230 to a remote secondary storage controller 240 for storage on a storage device 248. The primary storage controller 220 further includes a processor 222 for executing instructions relating to the transfer of the copies of data to the secondary storage controller 240. The secondary storage controller also includes memory which may be allocated to payload buffers 244 to hold incoming command and control information and data buffers 246 to hold incoming data. A processor 242 in the secondary storage controller 240 executes instructions relating to the allocation of memory space to buffers and to the receipt and ultimate storage of data.

Figure 3:
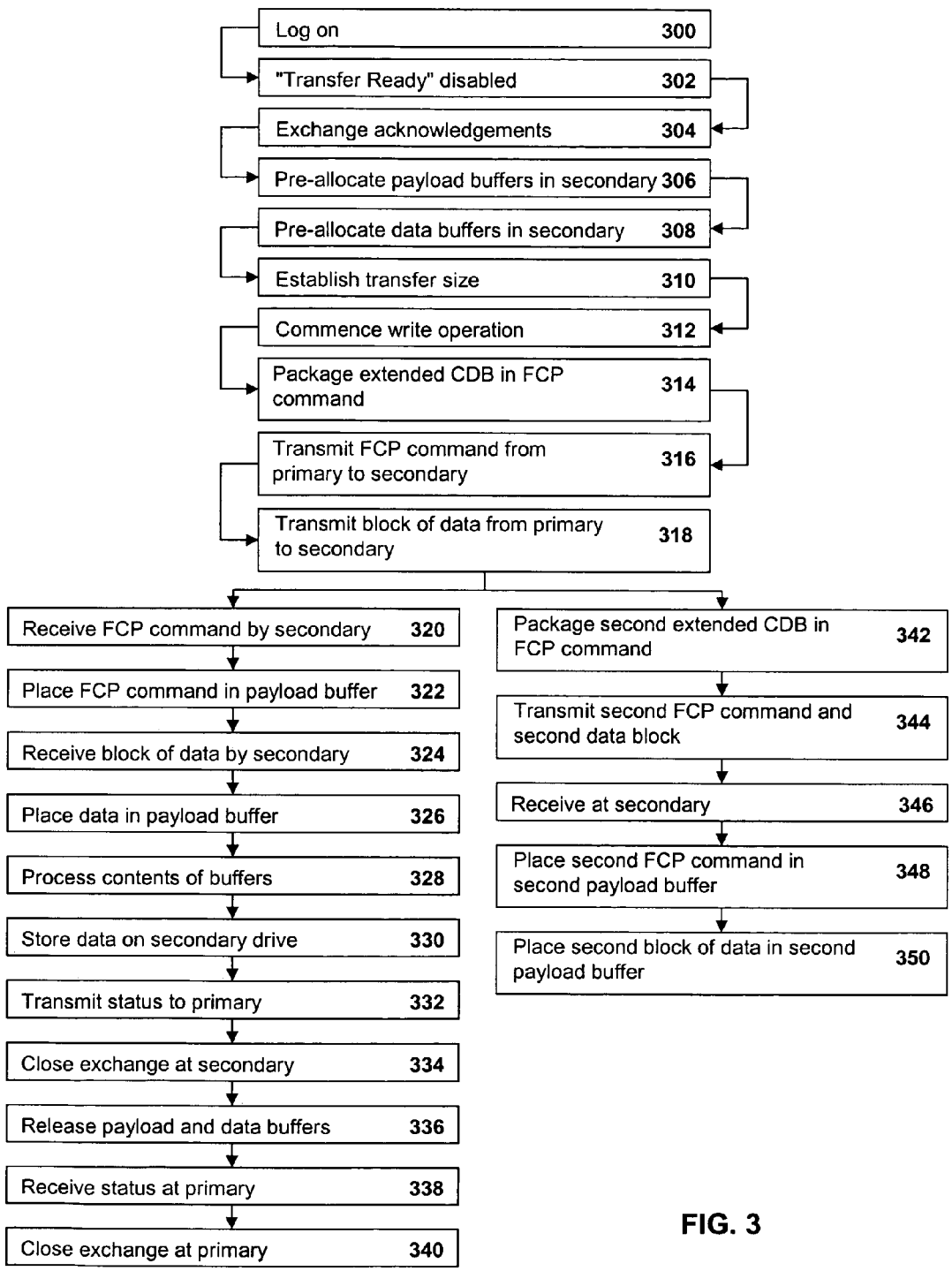
FIG. 3 is a flow chart of a method of the present invention.

Referring to the flow chart of FIG. 3, in operation, during a log-on process (step 300), the processors 222 and 242 in the primary and secondary storage controllers 220 and 240 optionally disable the "transfer ready" acknowledge requirement (step 302) and exchange acknowledgements to that effect (step 304). This step, if taken, eliminates one round trip of handshaking between the two units. The secondary controller 240 is then directed to pre-allocate some of its memory to payload buffers 244 (step 306). Each payload buffer is of sufficient size to hold a PPRC fibre channel protocol (FCP) command containing write control information as well as the write command itself. As will be described below, both data structures may be "packaged" in an extended command descriptor block (CDB) to eliminate another round trip, one which is not dedicated to the transfer of actual data to the secondary storage controller 240. The secondary controller 240 is also directed to pre-allocate some of the memory to data buffers 246 (step 308), each sufficient in size to hold a block of PPRC write data. The number of buffers of each type which are pre-allocated (that is, set aside prior to a data block actually being received by the controller) is not critical but may be determined by balancing performance (leading to more buffers being pre-allocated) against cost and available memory (leading to fewer buffers being pre-allocated).

The primary and secondary controllers 220 and 240 also establish the size of data which may be transferred in one write operation (step 310). Herein, the unit of data to be transferred will be referred to as a "block".

Figure 4:
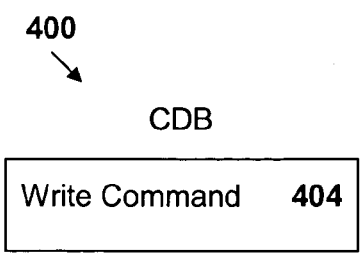
FIG. 4 illustrates an exemplary command descriptor block.
Figures 5A, 5B:
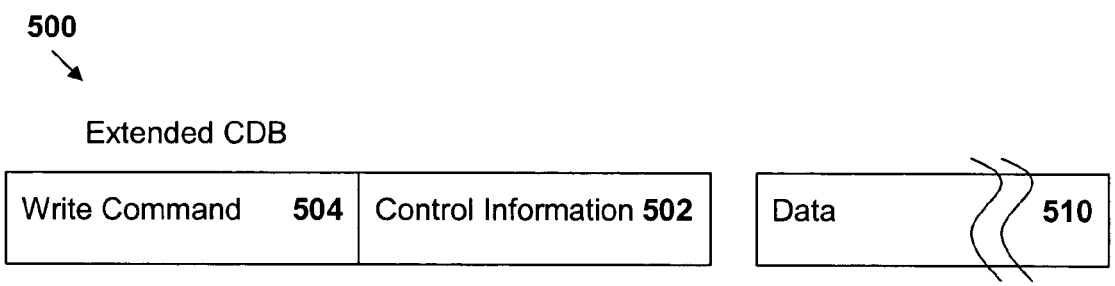
FIG. 5A illustrates an exemplary extended command descriptor block.
FIG. 5B illustrates an exemplary data block.

When the primary storage controller 220 issues a PPRC write command to commence a write operation (step 312), the primary storage controller 220 uses an extended CDB 500 (FIG. 5A) (step 314) to contain write control instructions 502 as well as the write command 504 to be transmitted to the secondary storage controller 240. A conventional CDB 400 (FIG. 4) is used to transmit only the write command 404 and has a size of approximately 16 bytes. In order to decrease the response time of a write operation and increase the efficiency of data transfers, an extended CDB 500, of approximately 80 to 96 bytes, is employed. The extended CDB 500 is carried inside the FCP command which is transmitted by the primary storage controller 220 to the secondary storage controller 240 (step 316). Subsequently, and without having received any "ready" signal from the secondary storage controller 240, the primary storage controller 220 transmits a block of data 510 (FIG. 5B) to the secondary storage controller 240 (step 318).

Upon receiving the FCP command from the primary storage controller 220 (step 320), the processor 242 of the secondary storage controller 240 directs that the FCP command be placed in one of the payload buffers 244 (step 322). The block of data 510 is received (step 324) and placed in one of the data buffers 246 (step 326). The contents of both the payload buffer 244 and data buffer 246 then are processed by the PPRC application executing inside the secondary storage controller 240 (step 328). The block of data 510 is ultimately stored on the storage device 248 (step 330), thereby completing the write operation. When the write operation has been completed, the secondary storage controller 240 transmits a status signal back to the primary storage controller 220 (step 332) and closes the exchange (step 334). The secondary storage controller 240 then releases the payload and data buffers (step 336) for subsequent re-use. When the primary storage controller 220 receives the status signal (step 338), it too closes the exchange (step 340).

Because the present invention supports "piping" of data, prior to the primary controller 220 receiving the status signal, the primary controller 220 may prepare a second FCP command, with write control information and a write command packaged in a second extended CDB (step 342). The second FCP command and an associated block of data may then be transmitted to the secondary controller 340 (step 344). Upon receipt by the secondary controller 240 (step 346), the second FCP command is placed in a payload buffer (step 348) and the second block of data is placed in a data buffer (step 350). The buffer in which the second FCP command is placed may be a second payload buffer (different from the first payload buffer) or may be the first payload buffer (if the first payload buffer has previously been released). Moreover, if the first payload buffer has not previously been released and no other payload buffer is available (that is, was not pre-allocated), the processor 242 may allocate additional memory space as an additional payload buffer, available to receive the second FCP command. Similarly, the second block of data is received into a data buffer, which may be the first data buffer (after being released), another pre-allocated data buffer or a newly allocated data buffer.

Each of the three steps alone, disabling the transfer ready acknowledgement, pre-allocating buffers, and packaging write control information with a write command in an extended CDB, reduces the number of round trips required for the transfer of data. Together, the number of required round trips may be reduced to one, thereby significantly decreasing the response time of a write operation, increasing total throughput and/or increasing the possible distance by which the primary and secondary storage controller 220 and 240 may be separated. In fact, the separation distance may be increased to approximately 400 km.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for transferring data in a PPRC environment, comprising:
   pre-allocating at least a first payload buffer in a secondary storage control unit;
   pre-allocating at least a first data buffer in the secondary storage control unit;
   issuing a first write command for the transfer of a first block of data from a primary storage control unit to the secondary storage control unit;
   packaging write control information with a fibre channel protocol (FCP) command within a first extended command descriptor block (CDB);
   transmitting the first extended CDB from the primary storage control unit to the secondary storage control unit; and
   transmitting the first block of data from the primary storage control unit to the secondary storage control unit.

2. The method of claim 1, further comprising disabling a "transfer ready" command prior to issuing the first write command.

3. The method of claim 1, further comprising:
   receiving the first extended CDB in a first payload buffer;
   receiving the first block of data in a first data buffer;
   completing a first write operation; and transmitting a first status indicator from the secondary storage control unit to the primary storage control unit acknowledging completion of the first write operation.

4. The method of claim 1, further comprising:
issuing a second write command for the transfer of a second block of data from the primary storage control unit to the secondary storage control unit;
packaging write control information with an FCP command within a second extended CDB;
transmitting the second extended CDB from the primary storage control unit to the secondary storage control unit; and
transmitting the second block of data from the primary storage control unit to the secondary storage control unit.

5. The method of claim 4, further comprising:
receiving the second extended CDB in a second payload buffer;
receiving the second block of data in a second data buffer;
completing a second write operation; and
transmitting a second status indicator from the secondary storage control unit to the primary storage control unit acknowledging completion of the second write operation.

6. The method of claim 5, wherein the second payload buffer and the second data buffer are pre-allocated.

7. The method of claim 5, wherein the second payload buffer and the second data buffer are allocated following receipt of the first extended CDB and the first block of data by the secondary storage control unit.

8. The method of claim 4, wherein the steps of transmitting the second extended CDB and transmitting the second block of data begin before the first status indicator is received by the primary storage control unit.

9. The method of claim 1, further comprising:
transferring the first block of data to a storage drive; and
releasing the first payload buffer and the first data buffer, whereby a subsequent extended CDB and block of data are receivable in the first payload buffer and first data buffer, respectively.

10. A peer-to-peer remote copy storage system, comprising:
a primary storage control unit;
a secondary storage control unit;
a first pre-allocated payload buffer in the secondary storage control unit;
a first pre-allocated data buffer in the secondary storage control unit;
means for issuing a first write command for the transfer of a first block of data from the primary storage control unit to the secondary storage control unit;
means for packaging write control information with a fibre channel protocol (FCP) command within a first extended command descriptor block (CDB);
means for transmitting the first extended CDB from the primary storage control unit to the secondary storage control unit; and
means for transmitting the first block of data from the primary storage control unit to the secondary storage control unit.

11. The system of claim 10, further comprising means for disabling a "transfer ready " command prior to issuing the first write command.

12. The system of claim 10, further comprising:
means for receiving the first extended CDB in the first payload buffer;
means for receiving the first block of data in the first data buffer;
means for completing a first write operation; and
means for transmitting a first status indicator from the secondary storage control unit to the primary storage control unit acknowledging completion of the first write operation.

13. The system of claim 10, wherein:
the means for issuing the first write command includes means for issuing a second write command for the transfer of a second block of data from the primary storage control unit to the secondary storage control unit;
the means for packaging write control information includes means for packaging write control information with an FOP command within a second extended CDB;
the means for transmitting the first extended CDB includes means for transmitting the second extended CDB from the primary storage control unit to the secondary storage control unit; and
the means for transmitting the first block of data includes means for transmitting the second block of data from the primary storage control unit to the secondary storage control unit.

14. The system of claim 13, further comprising:
a second payload buffer for receiving the second extended CDB; and
a second data buffer for receiving the second block of data.

15. The system of claim 14, wherein:
the means for completing the first write operation includes means for completing a second write operation; and
the means for transmitting a second status indicator includes means for transmitting a second status indicator from the secondary storage control unit to the primary storage control unit acknowledging completion of the second write operation.

16. The system of claim 15, wherein the second payload buffer and the second data buffer are pre-allocated.

17. The system of claim 15, wherein the second payload buffer and the second data buffer are allocated following receipt of the first extended CDB and the first block of data by the secondary storage control unit.

18. The system of claim 13, wherein transmitting the second extended CDB and transmitting the second block of data begin before the first status indicator is received by the primary storage control unit.

19. A peer-to-peer remote copy primary storage control unit, comprising:
means for directing that a first payload buffer be pre-allocated in a secondary storage control unit;
means for directing that a first data buffer be pre-allocated in the secondary storage control unit;
means for issuing a first write command for the transfer of a first block of data to the secondary storage control unit;
means for packaging write control information with a fibre channel protocol (FCP) command within a first extended command descriptor block (CDB);
means for transmitting the first extended CDB to the first payload buffer; and
means for transmitting the first block of data to the first data buffer.

20. The primary storage control unit of claim 19, further comprising means for disabling a "transfer ready" command prior to issuing the first write command.

21. The primary storage control unit of claim 19, further comprising:

means for receiving a first status indicator from the secondary storage control unit acknowledging completion of a first write operation.

22. The primary storage control unit of claim 19, wherein:
the means for issuing the first write command includes means for issuing a second write command for the transfer of a second block of data to the secondary storage control unit;
the means for packaging write control information includes means for packaging write control information with an FOP command within a second extended CDB;
the means for transmitting the first extended CDB includes means for transmitting the second extended CDB to the secondary storage control unit; and
the means for transmitting the first block of data includes means for transmitting the second block of data to the secondary storage control unit.

23. The primary storage control unit of claim 22, wherein:
the means for completing the first write operation includes means for completing a second write operation; and
the means for transmitting a second status indicator includes means for transmitting a second status indicator from the secondary storage control unit to the primary storage control unit acknowledging completion of the second write operation.

24. The primary storage control unit of claim 23, wherein the second payload buffer and the second data buffer are pre-allocated.

25. The primary storage control unit of claim 23, wherein the second payload buffer and the second data buffer are allocated following receipt of the first extended CDB and the first block of data by the secondary storage control unit.

26. The primary storage control unit of claim 22, wherein transmitting the second extended CDB and transmitting the second block of data begin before the first status indicator is received by the primary storage control unit.

27. A computer program product of a computer readable medium having computer-readable code embodied therein for transferring data in a PPRC environment, the computer-readable code comprising instructions for:
pre-allocating at least a first payload buffer in a secondary storage control unit;
pre-allocating at least a first data buffer in the secondary storage control unit;
issuing a first write command for the transfer of a first block of data from a primary storage control unit to the secondary storage control unit;
packaging write control information with a fibre channel protocol (FCP) command within a first extended command descriptor block (CDB);
transmitting the first extended CDB from the primary storage control unit to the secondary storage control unit; and
transmitting the first block of data from the primary storage control unit to the secondary storage control unit.

28. The computer program product of claim 27, further comprising instructions for disabling a "transfer ready" command prior to issuing the first write command.

29. The computer program product of claim 27, further comprising instructions for:
receiving the first extended CDB in a first payload buffer;
receiving the first block of data in a first data buffer;
completing a first write operation; and
transmitting a first status indicator from the secondary storage control unit to the primary storage control unit acknowledging completion of the first write operation.

30. The computer program product of claim 27, further comprising instructions for:
issuing a second write command for the transfer of a second block of data from the primary storage control unit to the secondary storage control unit;
packaging write control information with an FCP command within a second extended CDB;
transmitting the second extended CDB from the primary storage control unit to the secondary storage control unit; and
transmitting the second block of data from the primary storage control unit to the secondary storage control unit.

31. The computer program product of claim 30, further comprising instructions for:
receiving the second extended CDB in a second payload buffer;
receiving the second block of data in a second data buffer;
completing a second write operation; and
transmitting a second status indicator from the secondary storage control unit to the primary storage control unit acknowledging completion of the second write operation.

32. The computer program product of claim 31, wherein the second payload buffer and the second data buffer are pre-allocated.

33. The computer program product of claim 31, wherein the second payload buffer and the second data buffer are allocated following receipt of the first extended CDB and the first block of data by the secondary storage control unit.

34. The computer program product of claim 30, wherein transmitting the second extended CDB and transmitting the second block of data begin before the first status indicator is received by the primary storage control unit.

35. The computer program product of claim 27, further comprising instructions for:
transferring the first block of data to a storage drive; and
releasing the first payload buffer and the first data buffer, whereby a subsequent extended CDB and block of data are receivable in the first payload buffer and first data buffer, respectively.

* * * * *

UNITED STATES PATENT AND TRADEMARK OFFICE
CERTIFICATE OF CORRECTION

| | | |
|---|---|---|
| PATENT NO. | : 7,613,785 B2 | Page 1 of 1 |
| APPLICATION NO. | : 10/719229 | |
| DATED | : November 3, 2009 | |
| INVENTOR(S) | : Chen et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1715 days.

Signed and Sealed this

Fourteenth Day of December, 2010

David J. Kappos
*Director of the United States Patent and Trademark Office*